US010871062B2

(12) United States Patent
Gamarra et al.

(10) Patent No.: US 10,871,062 B2
(45) Date of Patent: Dec. 22, 2020

(54) SKID MOUNTED WELLHEAD DESANDERS AND FLOWBACK SYSTEMS

(71) Applicant: CONOCOPHILLIPS COMPANY, Houston, TX (US)

(72) Inventors: Francisco Gamarra, Houston, TX (US); Ramesh Sharma, Houston, TX (US); Curtis S. Andersen, Houston, TX (US); Bryan P. Weaver, Houston, TX (US); Juan Benavides, Jr., Houston, TX (US); Probjot Singh, Houston, TX (US); Charles B. Manula, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 16/585,369

(22) Filed: Sep. 27, 2019

(65) Prior Publication Data

US 2020/0116004 A1    Apr. 16, 2020

Related U.S. Application Data

(60) Provisional application No. 62/744,574, filed on Oct. 11, 2018.

(51) Int. Cl.
*E21B 43/34* (2006.01)
*B01D 21/26* (2006.01)

(52) U.S. Cl.
CPC ............ *E21B 43/34* (2013.01); *B01D 21/267* (2013.01)

(58) Field of Classification Search
CPC ..... B01D 21/267; B01D 21/265; E21B 43/34; E21B 43/35; E21B 43/36; E21B 43/38; E21B 43/385; E21B 43/40
See application file for complete search history.

(56) References Cited

U.S. PATENT DOCUMENTS

| 4,749,490 A | 6/1988 | Smyth et al. |
| 4,900,445 A | 2/1990 | Flanigan et al. |
| 4,956,090 A | 9/1990 | Robinson |
| 5,900,137 A | 5/1999 | Homan |

(Continued)

FOREIGN PATENT DOCUMENTS

| CN | 205638414 U | 10/2016 |
| WO | 2015095886 | 6/2015 |

OTHER PUBLICATIONS

Rawlings, C.H., Separating Solids First—Design and Operation of the Multiphase Desander, SPE-185658, available online at eprocess-tech.com/wp-content/uploads/2017/04/SPE-185658-MS.pdf.

(Continued)

*Primary Examiner* — James G Sayre
(74) *Attorney, Agent, or Firm* — Boulware & Valoir (57) ABSTRACT

Small footprint, portable skid mounted wellhead desander systems are disclosed. In one version, two systems are mounted on the skid, one system being a single well system for testing various properties of well fluids, and the other being a combined bulk system for desanding comingled flow from a plurality of wells. In another version, the skid mounted system has three independent desanders together with all essential equipment, including e.g., plug catcher, hydrocyclone desander, solids accumulator, choke manifold, and all necessary sensors, valving and control equipment.

16 Claims, 8 Drawing Sheets

(56) References Cited

U.S. PATENT DOCUMENTS

| | | | |
|---|---|---|---|
| 6,119,779 | A | 9/2000 | Gipson et al. |
| 6,582,600 | B1 | 6/2003 | Hashmi et al. |
| 7,635,430 | B2 | 12/2009 | Mildren et al. |
| 7,655,061 | B2 | 2/2010 | Parkinson |
| 8,475,664 | B2 | 7/2013 | Keyser et al. |
| 2008/0251468 | A1 | 10/2008 | Parkinson |
| 2012/0012309 | A1* | 1/2012 | Noles, Jr. ........... B01D 19/0042 166/267 |
| 2016/0341024 | A1* | 11/2016 | Unnam .............. B01D 17/0217 |

OTHER PUBLICATIONS

Rawlins, C.H., Application of Multiphase Desander Technology to Oil and Gas Production (2002), paper presented at the BHR 3rd International Conference on Multiphase Technology, Banff, AB, Canada, available online at eprocess-tech.com/wp-content/uploads/2016/10/ApplicationsOfMultiphaseDesanderTechnology.pdf.

Rawlins, H.C., Study on the Interaction of a Flooded Core Hydrocyclone (Desander) and Accumulation Chamber for Separation of Solids from Produced Water (2013), available online at eprocess-tech.com/wp-content/uploads/2016/10/PWS2014_Rawlins_DesanderStudyR.pdf.

en.wikipedia.org/wiki/Hydrocyclone.

International Search Report PCT/US2019/053469, dated Nov. 12, 2019 (3 pages).

\* cited by examiner

SKID MOUNTED WELLHEAD DESANDERS AND FLOWBACK SYSTEMS

PRIOR RELATED APPLICATIONS

This application claims priority to U.S. Ser. No. 62/744,574, filed Oct. 11, 2018, and incorporated by reference herein in its entirety for all purposes.

FEDERALLY SPONSORED RESEARCH STATEMENT

Not applicable.

REFERENCE TO MICROFICHE APPENDIX

Not applicable.

FIELD OF THE DISCLOSURE

This invention relates to oil production equipment, in particular to a skid mounted system comprising of flowback equipment for use with multiple wells, that can also be easily moved from well-pad to well-pad as needed during early production.

BACKGROUND OF THE DISCLOSURE

With the advent of ever longer lateral completion designs to increase overall hydrocarbon yields, proppant/sand use per well has significantly increased. A small fraction of proppant and/or sand used during completion process returns to the surface during initial production and its presence erodes equipment. In addition, operators are flowing back production at higher rates to exploit the full potential of the well, allowing even more sand to contaminate the flowback fluids. This paradigm shift has introduced new challenges for mitigating erosion of production equipment and accumulation of sand in production facilities. The erosion caused by produced sand is causing bottlenecks for initial production, resulting in slow ramp-up, asset degradation, and higher HSE exposure.

Typically, solids are removed with equipment called sand-cans, which are often gravity-based separation devices. Conventional sand-cans are distinguished from more sophisticated vessels called desanders that utilize cyclonic separation methods like hydrocyclones. A hydrocyclone (often referred to by the shortened form cyclone) is a device without moving parts that sorts particles in a fluid suspension based on the ratio of their centripetal force to fluid resistance.

Figure 1A:
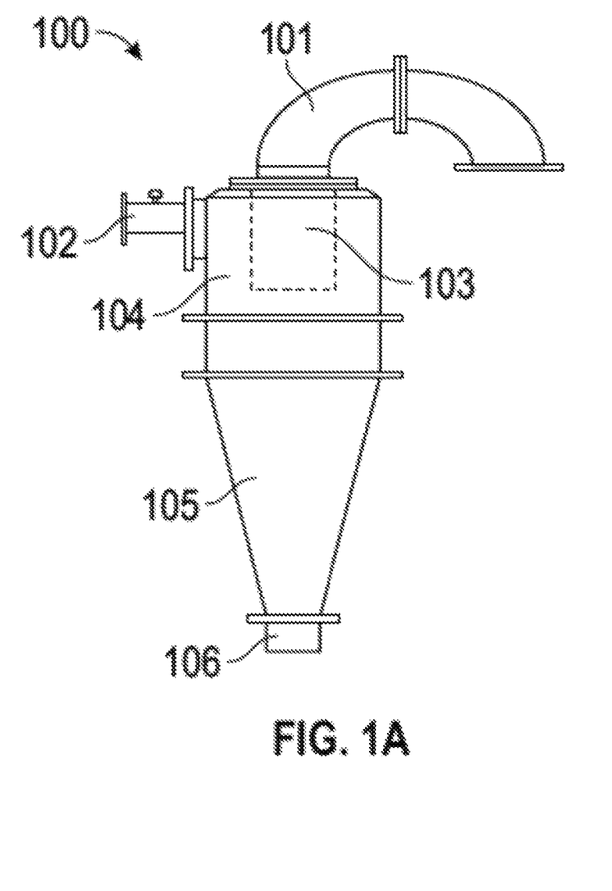
FIG. 1A. Exemplary hydrocyclone desander.
Figure 1B:
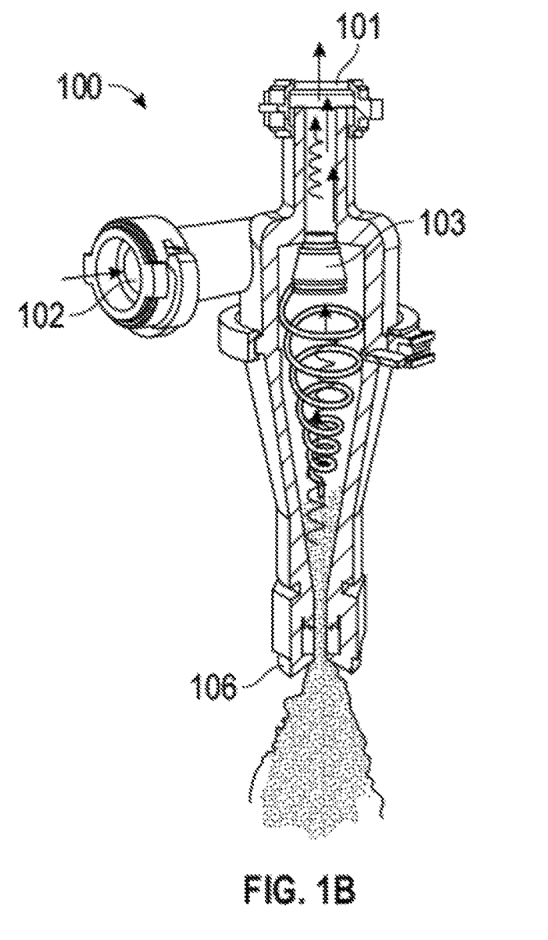
FIG. 1B. Functioning of hydrocyclone desander.

FIG. 1A illustrates the internal parts of a hydrocyclone, which are usually inside a housing (not shown), and FIG. 1B shows the hydrocyclone in action. A multiphasic flow enters through the feed inlet at an angle. Cycloning (fluid circulation around the chamber) starts to take place in the feed chamber, and the rotation is encouraged by the injection feed speed, pressure, the angle of injection, and the internal geometry of the chamber. The cone shape causes the spinning fluids to accelerate as they travel down the cone towards the apex (same flow, but in a smaller circumference), which generates high centrifugal forces. The heavier particles are slung outwards and move to the outer walls and eventually toward the apex. The lighter particles stay near the center of the cone, to be carried away by the vortex finder.

The desanding hydrocyclone—often just called a "desander"—was developed from mining hydrocyclones. The primary difference between a mining hydrocyclone and a hydrocyclone desander is that the latter operates with an enclosed underflow chamber. Both units have continuous inlet and overflow streams, but the desander has a batch underflow. The desander is thus properly termed a "flooded-core hydrocyclone". Enclosing the underflow also prevents air-core formation in the center of the vortex flow. The air core is a key feature in mining hydrocyclones, but is absent in a desander. Whereas the mining hydrocyclone processes fluids with a high solids content, the enclosed underflow on a desander limits the unit to a low solids concentration (<<1 wt. %). When the concentration of the solids is significantly larger than 1%, a standard hydrocyclone with open underflow would be a better design choice, but for produced oil and water, a flooded-core hydrocyclone is usually selected for use.

Figure 1C:
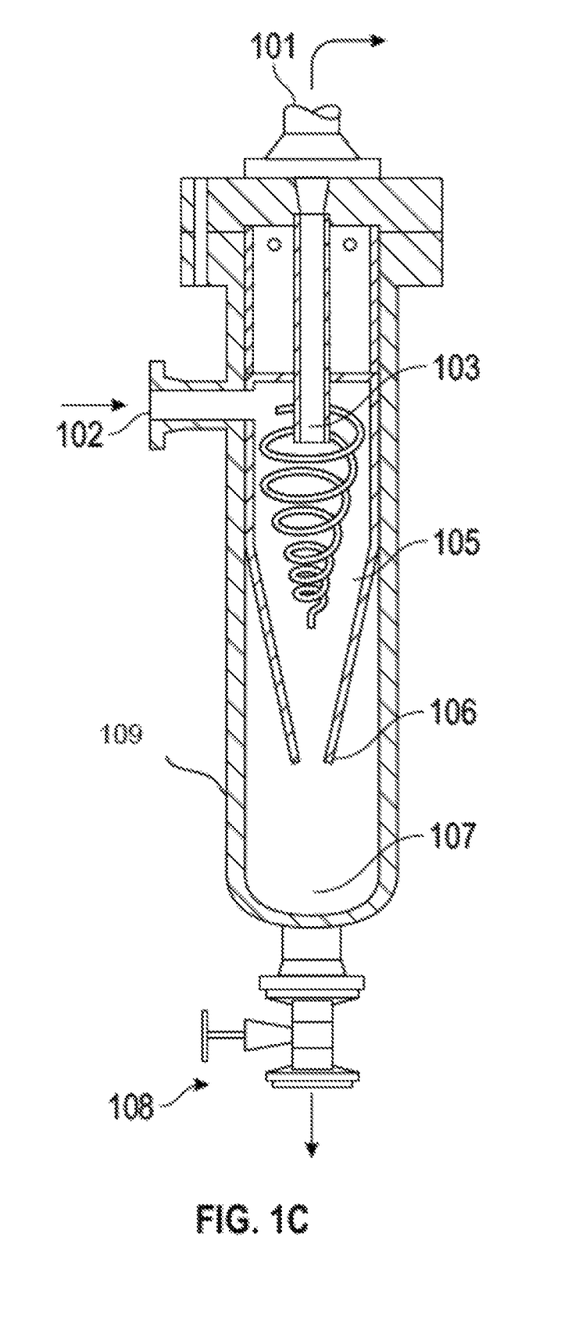
FIG. 1C. Multiphase desander with integral accumulator.

The development of the multiphasic desander began in the mid-nineties, and now there are hundreds of such installations in use. By careful control of the internal geometry of the desander, the multiphase desanding unit can treat a combined gas/liquid/solid flow with gas flows up to near 100%. Multiphase desanders operate based on a combination of hydraulic and pneumatic cyclonic principles. A typical multiphasic desander is shown in FIG. 1C, along with the housing and an integral solids accumulator. The accumulation chamber is a static body of water and the solids exiting the apex displace the accumulator water, which then has to return through the apex into the cyclone body to eventually discharge through the overflow.

Although these basic design principles are common to all hydrocyclone desanders, there are many variations in wellhead hydrocyclone design. See e.g., U.S. Pat. No. 8,475,664 Control method for hydrocarbon hydrocyclones; U.S. Pat. No. 7,655,061 Cyclone assembly and method for increasing or decreasing flow; U.S. Pat. No. 7,635,430 Relating to well head separators; U.S. Pat. No. 6,582,600 Two-stage hydrocyclone system; U.S. Pat. No. 4,956,090 Hydrocyclone divided into sections; U.S. Pat. No. 4,749,490 Cyclone separator; U.S. Pat. No. 4,900,445 Low pressure hydrocyclone separator, each incorporated by reference in its entirety for all purposes.

Figure 2:
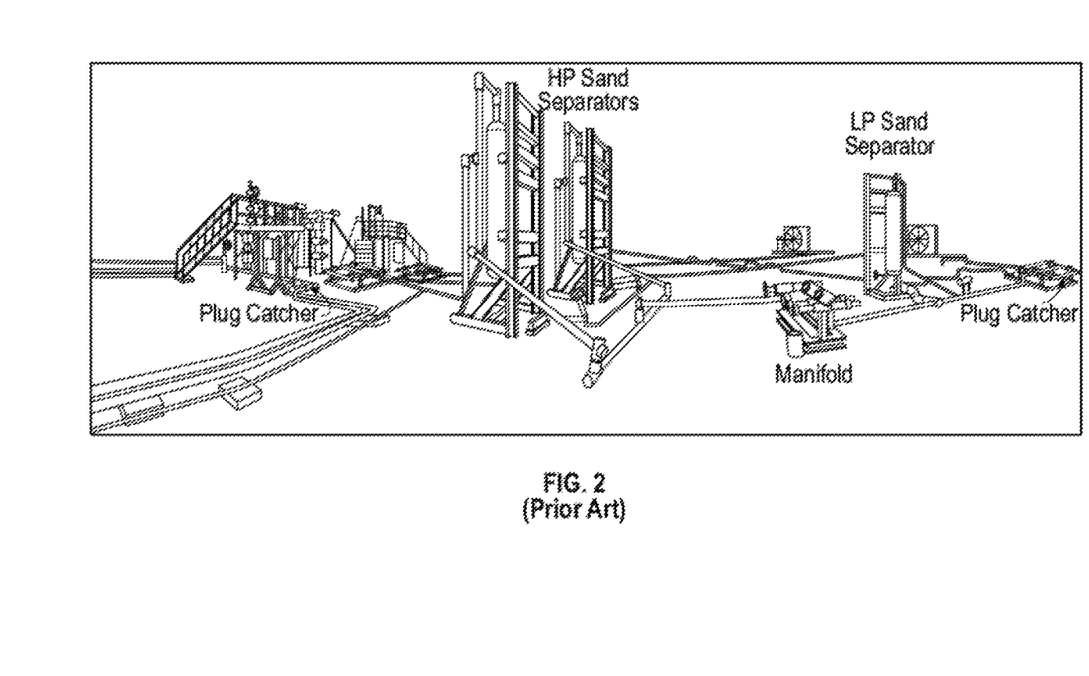
FIG. 2. (prior art) Current desanding technology.

Fluids can be desanded at different locations within the process train of a producing hydrocarbon well, including downhole and at the central processing facility ("CPF"). Downhole removal is technically challenging due to the small space available, and the need to provide a desander in each well. Central processing facility provides more space and a central desanding facility for all wells. However, removing solids at or near the wellhead (upstream of the central processing facilities) offers a number of advantages over CPF desanding:

Protects all downstream equipment from erosion damage
Prevents build-up of solids in all downstream equipment
Overall risk reduction to on-going production
Cleaner sand production before processing has allowed the sand to get oil wet
Reduces the need for vessel entry Each well-pad can have multiple wells, anywhere between 2-12 with 4-6 being most common for each pad. The flowback for each well can consist of flowlines, a plug-catcher, high-pressure desanders, a choke manifold, downstream low-pressure desanders, and flowback waste tanks. These multiple pieces of equipment are typically provided by different vendors. In fact, in our current desanding operations, as many as 6 different vendors are contracted with. FIG. 2 shows the typical equipment layout for current wellhead desanding operations. Each item of flowback equipment listed above is needed for each well. As such, a very large footprint is needed, and set-up, maintenance, and moving to the next well-pad all contribute to decreased efficiencies and increased cost.

Thus, what is needed in the art are better methods and equipment for well-pad flowback operations, especially for multi-well pads. The ideal method or system would be compact, easily run with few operators, preferably be able to handle more than one well, and be readily mobile. This invention addresses one or more of those needs.

SUMMARY OF THE DISCLOSURE

The invention combines one or more desanders along with the needed control equipment on a movable skid. Preferably, at least three or at least four high-pressure desanders are provided in a skid, along with the piping needed to connect to wellhead production lines, all flange connections within the skid, a plug catcher, valving and safety systems for pressure control, various safety and control valves, a solids discharge line, and desanded fluid discharge line, and an automated choke manifold with a processor having SCADA or PLC control systems for overall flow control. Flowmeters can also be included therein.

Figure 3:
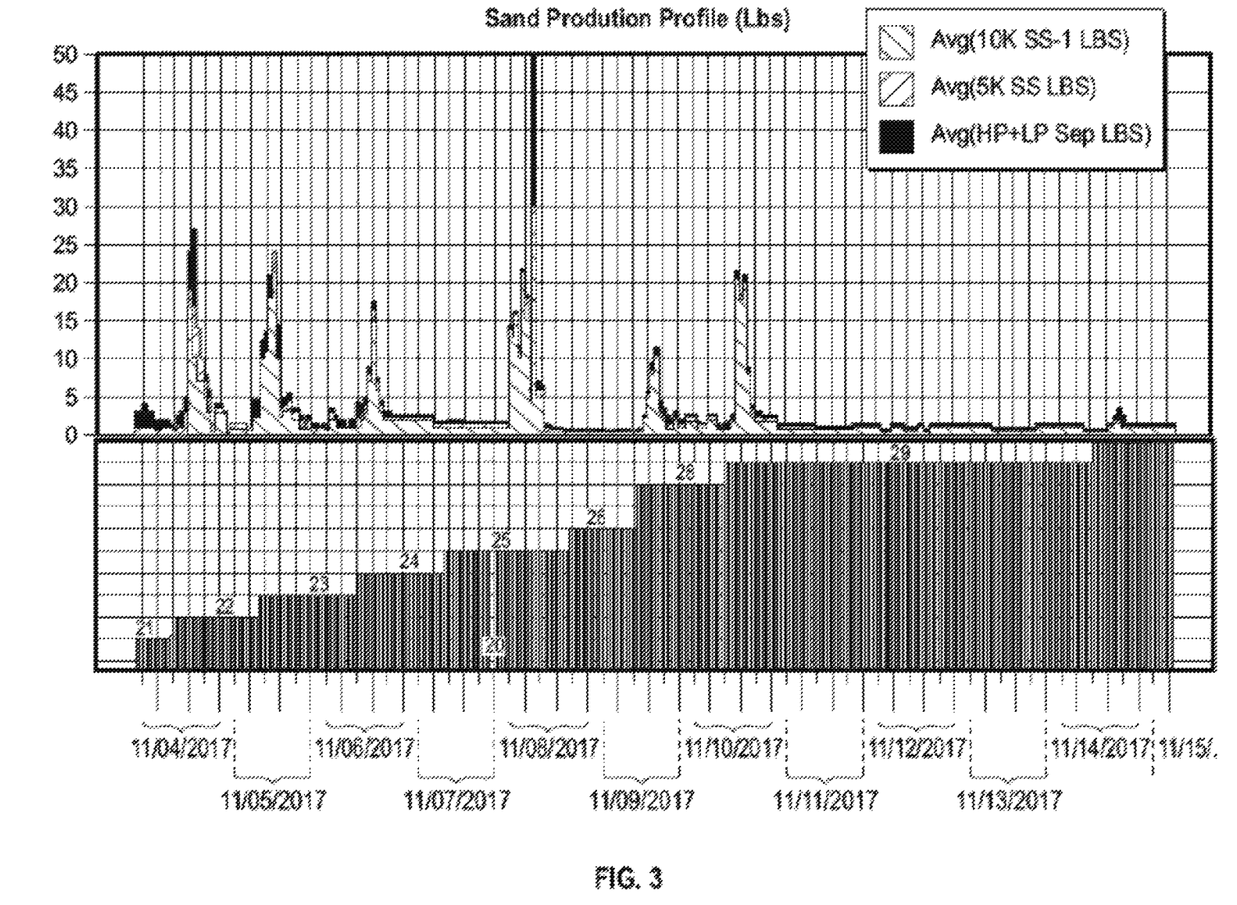
FIG. 3. Top panel is sand production, and lower panel shows choke opening. As can be seen, whenever choke size is increased, there is a surge in sand production that tapers off in a couple of hours.

The desander and choke manifold are preferably designed with automated control valves to allow remote operation of the flowback. The desander operation can thus be adjusted according to remote choke settings. When bringing the well on-line, gradual opening of choke is needed. With every change in choke setting, there is an increase in sand production from the well for at least first 2-6 hours (see FIG. 3). By automating the desander, blowdown frequency from the desander can be remotely adjusted according to the sand production, with more frequent dumping during the first 2-6 hrs and then tapering down when sand production decreases.

In some embodiments, multiple desanders and all needed piping and control equipment are placed on a single skid, but the lines are established such that the flow from each well is separately handled. See e.g., FIG. 5.

In another embodiment, however, separated or comingled flow is possible. Facility design has recently moved away from individual separation to process and allocate reservoir fluids. Instead, producers have shifted to a bulk and test configuration, which has established a solid foothold in unconventional plays to minimize equipment cost while maximizing facility throughput capacity. The bulk and test facility design consists of two main production trains (a bulk system and a test system) downstream of a spider valve or other valving to allow a well to be sent to the bulk or the test facilities.

The spider valve is a multi-port valve with 7-3" connections and can route the flow of a single well through the test production train where oil, water and gas are measured for allocation purposes (accounting for royalties and the like). The remaining wells are comingled and sent to the larger bulk train. All flows are again comingled downstream of the production trains where gas is sold, and oil and water are commonly stored.

The bulk and test design philosophy was incorporated as an optional mode of operation into a desanding skid by including a valve manifold system and control logic integrated into the bulk and test facility PLC. With the integration of the bulk and test manifold system on the desanding skid—depending on the quantity of wells producing on a single pad and production rates—a single desanding skid may be able to service up to 5 wells or up to 8,000 barrels of total fluid while only utilizing 2 skid-mounted desanders.

The valve manifold generally consists of two flow control valves on all wells that are producing to the desander skid. Each production line from each well will thus have the option to be produced either into the bulk desander or into the test desander unit. Flow from the valves routing flow to the bulk unit is typically comingled, processed and then ran through an automated choke before being repartitioned to separate flowlines to the spider valve. This repartitioning step is often required due to the very high flow needs, but with larger pipes or lower flow rates repartitioning may be optional.

Flow from the single well produced into the test desander unit will be processed and then routed through an automated choke before tying into the test flowline to the central processing facility. In addition, with this pipeline arrangement, it would also be possible to send flow from a single well to the bulk can (e.g. no comingling) and then on to the CPF facility, should such an arrangement be needed. If preferred, the test line can be comingled with the bulk flow once the components are tested (e.g., oil, gas and water proportions measured).

A separator and flowmeter can also be mounted on the skid, or can be downstream of the skid as desired and based on space considerations. In another embodiment, the desander itself acts as a separator, and all that is needed are flow meters. In one embodiment, the test desander is combined with a phase separator and flow meters to measure oil, water and gas contributions to the test fluid. In another embodiment, these test devices are downstream of the skid. The test fluid can thus be combined with the bulk fluids, if metered right at (after) the desander, but can also be kept separate until after testing downstream of the skid, or can be kept separate all the way to the CPF. Flowmeters can also be included with the bulk desander, the two flowmeters determining total gas, water and oil.

With the advances in automated choke technology, the applications on this skid will allow consistent pressure and drawdown management for the bulk system once flows are comingled. On the test system, the automated choke will give consistent, reliable and repeatable test conditions in the facility. Once through the choke and into the flowline, the partitioned flowlines coming from the bulk separator will feed into the spider valve as normal. The test flowline, however, will flow to the spider valve that has been fixed in a single position and will not actuate unless the other wells linked to the spider valve are not producing into the desanding skid. This will be addressed in the rudimentary controls section of this description.

The production valve manifolds will be operated by either operator interaction and management of the test schedule or preferably through actuated control valves that have been programmed and integrated to mimic the spider valve control logic. In the scenario where the spider valve at the facility is fixed and no other wells are producing into the CTB, it will be possible to automate the skid PLC to manage and adhere to the testing schedule and have the valve status of the corresponding well communicating with the facility PLC that is uploading information to cygnet and other production data repositories seamlessly. In the automated case where the skid is operating on a facility with wells producing to the spider valve that are not produced through the desanding skid, there will be additional programming that will be considered based on the number of wells producing into the spider valve as well as the number of wells producing into the bulk and test skid. The program will dictate to the spider valve which ports must be cycled through to comply with the testing schedule that has been set out by BLM regulations (for common ownership—quarterly 72-hour flow tests are required; for diverse ownership—monthly 24-hour flow tests are required).

There is a special case to consider that has been factored into the design of the desanding skid. Unit Line Wells (ULW) are wells with laterals drilled on the border of two Drill Spacing Units (DSU) and per BLM regulations the produced fluids cannot be comingled with other wells producing to the facility before the oil, water and gas volumes have been metered. Therefore, the modular design of the desander skid will provide the flexibility to run an independent desander for the ULW without causing any changes to the process and programming of the bulk and test system.

As used herein, a "hydrocyclone desander" refers to a hydrocyclone with closed underflow, e.g., a "flooded-core hydrocyclone."

A "hydrocyclone," by contrast, includes both air-core and flooded-core hydrocyclones.

A "multiphase desander" or "multiphase hydrocyclone desander" refers to a desander configured to separate solids from a solid-liquid-gas mixture.

A "wellhead desander" or "wellhead hydrocyclone desander" refers to a desander installed upstream of the choke. By contrast, a "wellstream desander" or "wellstream hydrocyclone desander" refers to a desander installed downstream of the choke. Both units operate in multiphase flow and are of similar design. The main difference in each is due to mechanical design requirements. A wellhead desander may be designed for 5,000-15,000 psi API rating, while a wellstream desander is typically designed for 150#-600# ASME. Benefits of pre-choke installation include protection of the choke and all downstream process equipment, lower actual volume of fluids to be treated (smaller diameter desander), possible elimination of PSV as the unit is designed for full shut-in pressure. Benefits of post-choke installation include lower design pressure and potential to treat several wells through a single unit.

As used herein, a "plug catcher" also known as a "junk catcher," "rock catcher" and the like, is a small device designed to remove larger pieces of well debris from the well effluent. It is typically positioned upstream of the wellhead desander. Plug catchers typically consist of a horizontal mounted manifold with a catcher chamber with an internal perforated pipe to collect debris and a by-pass line to allow the screen to be isolated, de-pressurized and the debris to be collected and measured as required. Dual barrel designs with twin screens allow flow to be switched from one leg to the other and maintain continuous, uninterrupted flow to the well. Various sized screens can be removably installed (4, 6, 8, 10, and 12 mm). As used herein, a screen of 8-12 mm would be appropriate, but varying the size according to expected solid size is within the skill of any operator.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations or definitions are used herein:

| TERM | MEANING |
| --- | --- |
| API | American Petroleum Institute |
| BF | Bulk flow or Bulk flowline |
| BLM | Bureau of Land Management-many wells are drilled on public land. |
| Choke | A device incorporating an orifice that is used to control fluid flow rate or downstream system pressure. Chokes are available in several configurations for both fixed and adjustable modes of operation. Adjustable chokes enable the fluid flow and pressure parameters to be changed to suit process or production requirements. Fixed chokes do not provide this flexibility, although they are more resistant to erosion under prolonged operation or production of abrasive fluids. |
| Choke manifold | A set of high-pressure valves and associated inlet and outlet piping that usually includes at least two adjustable chokes, arranged such that one adjustable choke may be isolated and taken out of service for repair and refurbishment while well flow is directed through the other one. |
| Christmas tree | Christmas tree, or "tree", is an assembly of valves, spools, and fittings used for an oil well, gas well, water injection well, water disposal well, gas injection well, condensate well and other types of wells. A tree often provides numerous additional functions including chemical injection points, well intervention means, pressure relief means, monitoring points (such as pressure, temperature, corrosion, erosion, sand detection, flow rate, flow composition, valve and choke position feedback), and connection points for devices such as down hole pressure and temperature transducers (DHPT). |
| CPF | Central Processing Facility. In order to avoid shipping crude oil or raw natural gas with high percentages of impurities across the globe to be separated after transportation, the oil and gas companies have developed the concept of Central Processing |

-continued

| TERM | MEANING |
|---|---|
| | Facility or CPF, installed as closed as possible to the production wells.<br>If the main production of the field is crude oil, the purpose of the CPF is to separate the oil from the associated gas, the water and solvents or additives. The water may be treated and disposed or re-injected to enhance the production. The solvents and additives are collected to re-use. |
| CTB | Central tank battery |
| DSU | Drill Spacing Units |
| Flowback | The process of allowing fluids to flow from the well following a treatment, either in preparation for a subsequent phase of treatment or in preparation for cleanup and returning the well to production. |
| HSE | Health, safety and environment |
| PLC | Programmable logic controller |
| PRV | Pressure relief valve |
| PSV | Pressure Safety Valve-a type of valve used in the petroleum (downstream, midstream, upstream) and chemical processing industries to quickly release gasses from equipment in order to avoid over-pressurization and potential accidents. PSVs are activated automatically when pressure exceeds prescribed pressure limits in order to return equipment pressure to a safe operating level. While the term is sometimes used interchangeably with pressure relief valve (PRV), there is a difference between the two. A PSV is opened suddenly once the pressure hits a certain level, while a PRV opens gradually in relation to the pressure. |
| SCADA | Supervisory control and data acquisition. A monitoring software used to monitor and control the PLC. |
| ULW | Unit Line Wells |
| WC | Wellhead choke-A wellhead choke controls the surface pressure and production rate from a well. Chokes usually are selected so that fluctuations in the line pressure downstream of the choke have no effect on the production rate. This requires that flow through the choke be at critical flow conditions. Under critical flow conditions, the flow rate is a function of the upstream or tubing pressure only. For this condition to occur, the downstream pressure must be approximately 0.55 or less of the tubing pressure. |

BRIEF DESCRIPTION OF THE DRAWINGS

FIG. 4A-B. A skid with a single plug catcher, desander with integrated accumulator and choke manifold. This diagram is simplified for clarity, with only the major components drawn. FIG. 4A is a schematic view. FIG. 4B shows a perspective view with piping omitted for clarity.

DETAILED DESCRIPTION

The present invention is exemplified with respect to hydrocyclone desanders used at the wellhead for production fluids. However, this is exemplary only, and the invention can be broadly applied to drilling mud, and other fluids, gas wells, and other well types, and can also be updated to include other desander types, such as gravity desanders, gas desanders, and the like. The following description is intended to be illustrative only, and not unduly limit the scope of the appended claims.

The invention provides a novel skid mounted wellhead desander system, preferably having two or three desanders thereon, although more or less could be provided. The use of a plurality of desanders and all associated equipment on a single skid greatly minimizes the footprint of the devices, and still allows the desanding of produced fluids from a number of wells. Because the entire system is skid mounted, it can easily be moved to another section of a play and quickly deployed.

FIG. 1A shows the main parts of a hydrocyclone desander 100, including the inlet adaptor 102 for receiving the slurry from the wellhead, the feed chamber 104, the vortex finder 103, the overflow return 101 for desanded fluid exit, the cone body 105 and the apex or exit for solids 106. FIG. 1C shows a flooded core multiphase desander which includes the integrated accumulator 107 for accepting sand, and a single housing 109 containing both the hydrocyclone and the accumulator in one unit.

Figure 4A:
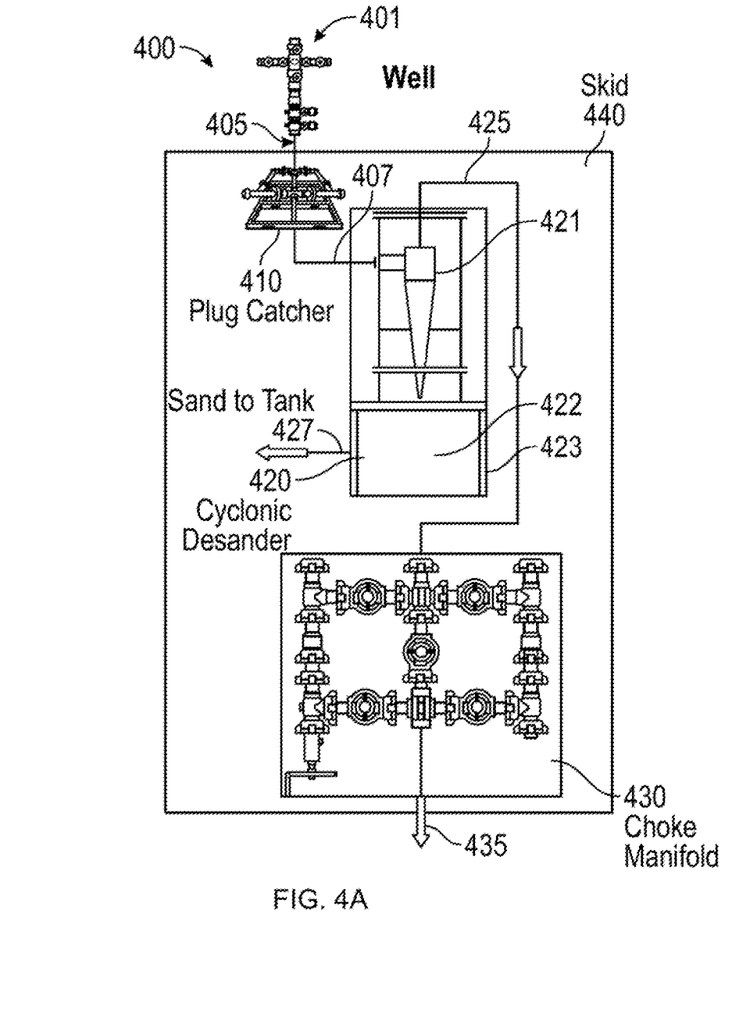
Figure 4B:
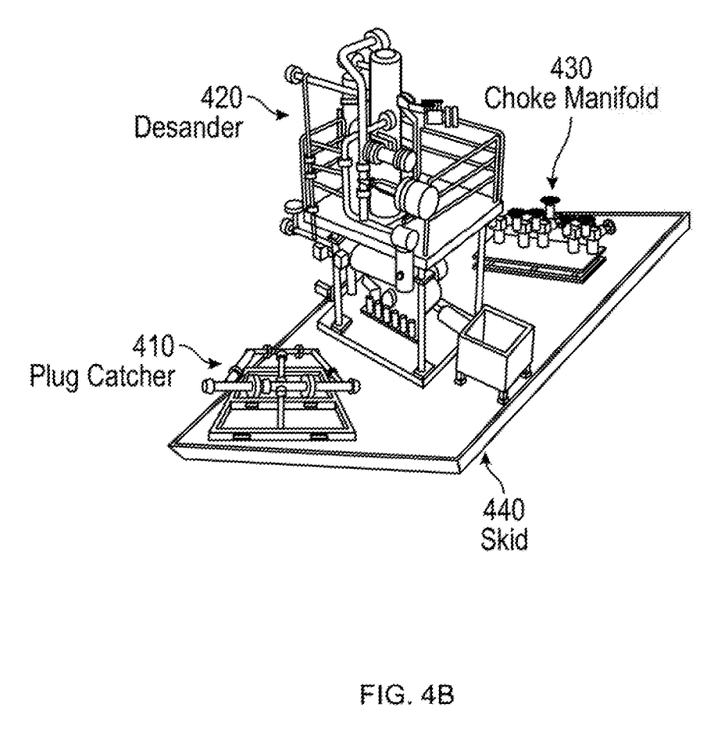

FIG. 4A-B shows a skid 440 mounted single desander 420 with cyclonic separator 421, integral accumulator 422 inside housing 423. Also seen is choke manifold 430 downstream of the desander 420 and plug catcher 410 upstream thereof. In use, a slurry of fluid and solids is produced by well 400 through the Christmas tree 401 and via piping 405 to the plug catcher 410. Large solids are trapped herein.

The slurry then passes via line 407 into the inlet (see FIG. 1) of the desander 420 and the cyclone 421 separates the sand from the fluids. The sand exits the apex (see FIG. 1) and falls to the accumulator 422, and when a certain level is reached, it is pumped via sand line 427 to a tank, pond, drying equipment, etc. as desired for sand treatment and storage.

Clean (desanded) fluid rises via the vortex catcher (see FIG. 1) and exits fluid line 425 to the choke manifold 430, and from thence via exit line 435 to the central processing facility. Other equipment can be added thereto, and common equipment, such as emergency shutoff valves, pressure sensors, flowmeters and the like, are omitted from this schematic for clarity.

Figure 5:
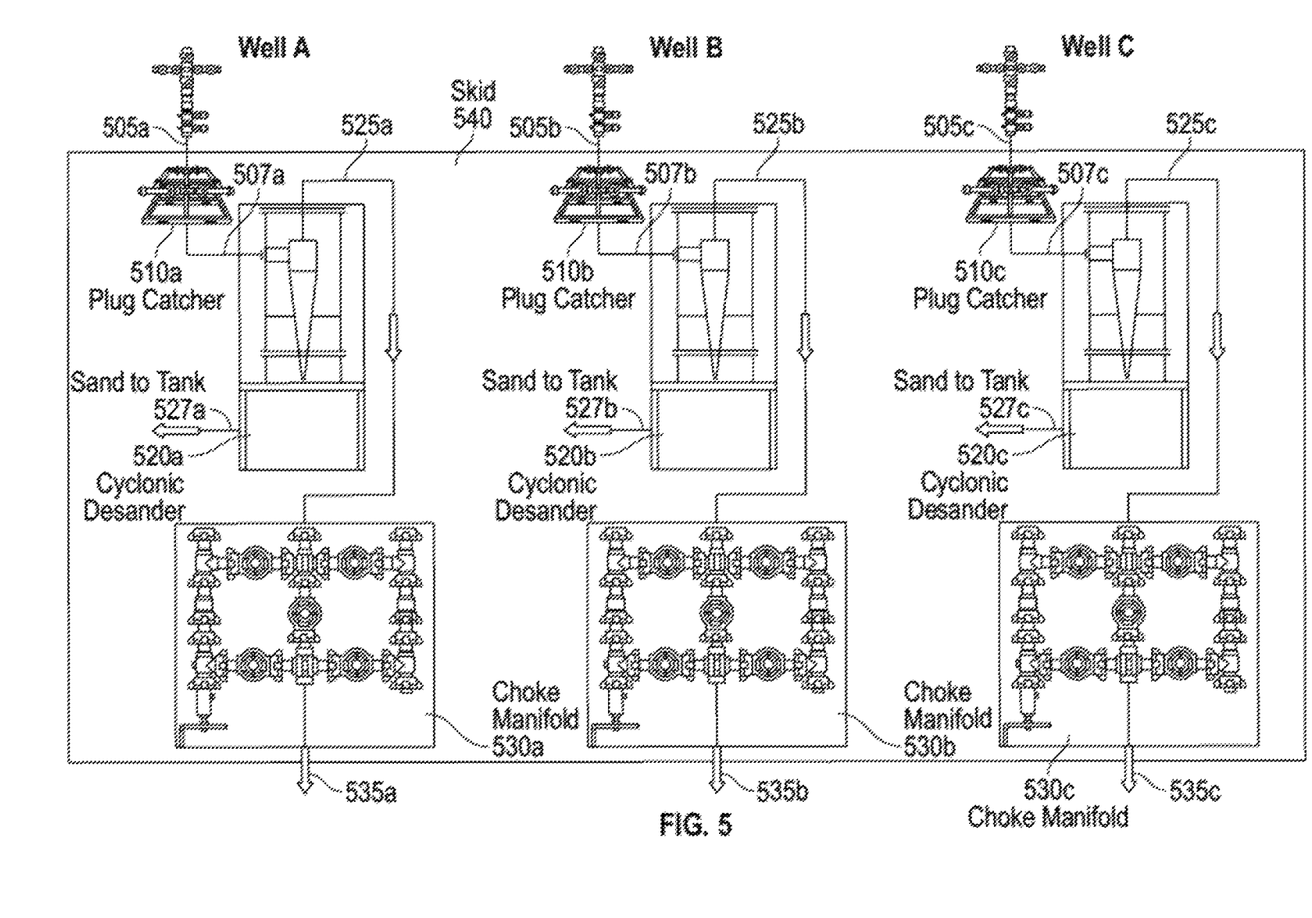
FIG. 5. A three desander, three plug catcher, and three choke manifold system set up on a single skid (about 7×25 ft). The three separate fluid lines allow multiple wells to be handled at the same time without mixing the fluids.

FIG. 5 shows an embodiment with three desander system set up so as to independently process the produced fluids from three separate wells (well A, B, C). Of course, the number of desanders can vary. Here we see a skid 540 mounted with three desanders 520a, 520b, 520c, each desander with a cyclonic separator and integral accumulator inside a housing. Lines 505a, 505b, 505c lead from wells A, B, C to three plug catchers 510a, 510b, 510c, which are upstream of the desanders 520a, 520b, 520c and connect thereto via lines 507a, 507b, 507c. Lines 525a, 525b, 525c lead from desanders 520a, 520b, 520c to choke manifolds 530a, 530b, 530c and lines 527a, 527b, 527c lead to sand tanks or sand ponds (not shown). Also seen are three choke manifolds 530a, 530b, 530c downstream of each desander 520a, 520b, 520c with lines 535a, 535b, 535c to other equipment, typically a CPF.

Other equipment can be added thereto, and common equipment, such as emergency shutoff valves, pressure sensors, flowmeters, and the like, are omitted from this schematic for clarity. The footprint size of the entire system will vary as needed to accommodate the equipment, but a typical size would be 4-8 feet by 5-25 feet. The smallest footprint that will still accommodate the equipment and allow complete access to all components is preferred. We have illustrated the system and will develop prototypes with commercially available components, purchased from different vendors, but anticipate that custom units will be designed and built for actual use. Custom design and fabrication is expected to allow us to further shrink the footprint as spacing can be optimized during the design phase.

Figure 6:
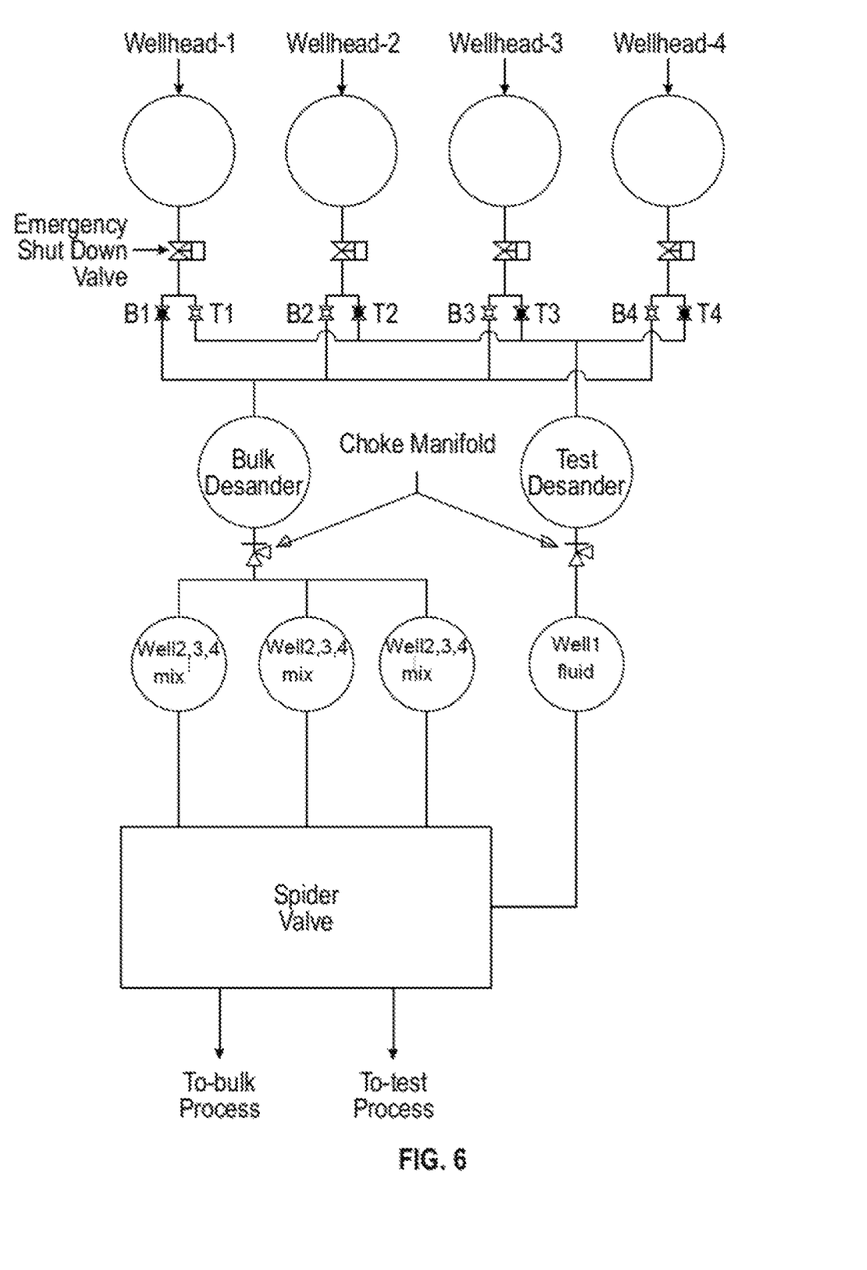
FIG. 6. A two desander system on a single skid with piping to allow each well to be tested (test desander) to determine its flow and the various contributions to flow of each well sequentially, as is typically needed to meet BLM regulations. A bulk desander can simultaneously or sequentially desand the remaining wells (3 shown, 4 in total), depending on whether the bulk lines are all opened at once, or sequentially.

FIG. 6 shows a preferred embodiment with bulk and test process trains. Here each well (four shown) has two fluid connections to the skid mounted desanders—one to the test desander, which is controlled by a test valve (T) and one which leads to the bulk desander (B). Thus well 1 has a line leading to the test desander that is controlled by valve T1, and a line leading to the bulk desander that is controlled by valve B1. Well 2 has a line leading to the test desander that is controlled by valve T2, and a line leading to the bulk desander that is controlled by valve B2, etc. Of course, a spider valve could control each of these flows, but for clarity single valves are shown.

For example, assume that well 1 is flowing to the test desander, as shown in FIG. 6. If so, B1 is closed (black circle) and T1 is open. Each of B2, B3, and B4 is open, and therefore each is comingled and running to the bulk desander, and accordingly, each of T2, T3, and T4 is closed. To switch well 3 over to the test sander, the operator or control system first opens T3, so as to prevent the blockage of flow, and then closes B3. Next, B1 is opened, and T1 is closed. Thus, now well 3 is sending flowback to the test desander system, and wells 1, 2 and 4 are flowing to the bulk desander.

These valving decisions can be made via, e.g., Emerson multiport valve (a.k.a. spider valve), a motor operated valve manifold, or manually operated valve, as desired. However, automated operation is expected to be preferred.

The test flowline, however, will flow to the spider valve that has been fixed in a single position and will not actuate unless the other wells linked to the spider valve are not producing into the desanding skid.

The following references are incorporated by reference in their entirety for all purposes.

U.S. Pat. No. 8,475,664 Control method for hydrocarbon hydrocyclones
U.S. Pat. No. 7,655,061 Cyclone assembly and method for increasing or decreasing flow
U.S. Pat. No. 7,635,430 Relating to well head separators
U.S. Pat. No. 6,582,600 Two-stage hydrocyclone system
U.S. Pat. No. 4,956,090 Hydrocyclone divided into sections
U.S. Pat. No. 4,900,445 Low pressure hydrocyclone separator
U.S. Pat. No. 4,749,490 Cyclone separator
SPE-185658-MS (2017) Rawlins, C. H., Separating Solids First—Design and Operation of the Multiphase Desander, available online at eprocess-tech.com/wp-content/uploads/2017/04/SPE-185658-MS.pdf
Rawlins, C. H., Application of Multiphase Desander Technology to Oil and Gas Production (2002), paper presented at the BHR 3rd International Conference on Multiphase Technology, Banff, AB, Canada, available online at eprocess-tech.com/wp-content/uploads/2016/10/ApplicationsOfMultiphaseDesanderTechnology.pdf
Rawlins, H. C., Study on the Interaction of a Flooded Core Hydrocyclone (Desander) and Accumulation Chamber for Separation of Solids from Produced Water (2013), available online at eprocess-tech.com/wp-content/uploads/2016/10/PWS2014_Rawlins_DesanderStudyR.pdf
en.wikipedia.org/wiki/Hydrocyclone

What is claimed is:

1. A portable hydrocarbon desanding system for desanding production fluids from multiple wellheads, said system comprising a movable skid base on which is affixed at least two independent desander systems, each independent desander system comprising the following elements:
   a) inlet piping for receiving a slurry comprising oil, water, gas and solids directly from a wellhead of a hydrocarbon well;
   b) said inlet piping fluidly connected to an optional plug catcher and thence to an inlet of a hydrocyclone desander;
   c) said desander being fluidly coupled to a solids accumulator;
   d) said solids accumulator having a solid discharge outlet;
   e) said desander having a cleaned fluid discharge outlet;
   f) said cleaned fluid discharge outlet being fluidly connected to a choke manifold that is fluidly connected to a central processing facility (CPF); wherein said skid base has two independent desander systems—a first desander system being a test desander system for desanding a slurry from a single well, and a second bulk desander system for desanding a comingled slurry from more than one well.

2. The system of claim 1, wherein said desander and said solids accumulator are integral.

3. The system of claim 1, wherein said desander is a hydrocyclone desander.

4. The system of claim 1, wherein said desander is a flooded core hydrocyclone desander.

5. The system of claim 1, wherein said choke is an automated choke manifold.

6. The system of claim 1, wherein said desander is a high pressure hydrocyclone desander.

7. The system of claim 6, further comprising a low pressure desander mounted on said skid.

8. The system of claim 6, further comprising a low pressure desander downstream of said choke manifold and upstream of said CPF.

9. A portable hydrocarbon desanding system for multiple wellhead use, said system comprising:
   a) a movable skid base on which is affixed:
      i) a first desander system being a test desander system for desanding a flow from a single well; and
      ii) a second desander system for desanding a comingled flow from more than one well;
   b) wherein a plurality of wells at a well-pad are fluidly connected to both said first desander system and to said second desander system;
   c) wherein each desander system comprises the following elements:
      i) inlet piping for receiving a slurry comprising oil, water, gas and solids from a well;
      ii) said inlet piping fluidly connected to an optional plug catcher for trapping large debris from said slurry and then to an inlet of a desander;
      iii) said desander being fluidly coupled to an integral solids accumulator;
      iv) said solids accumulator having a solid discharge outlet;
      v) said desander having a cleaned fluid discharge outlet;
      vi) said cleaned fluid discharge outlet being fluidly connected to a choke manifold; and
      vii) said system further comprising one or more emergency shut off valve(s);
   d) wherein said cleaned fluid discharge outlet from said first desander system is fluidly connected to a testing system for testing one or more properties of said cleaned fluid, and thereafter is fluidly connected to a separate CPF; and
   e) wherein said cleaned fluid discharge outlet from said second desander system is fluidly connected to said separate CPF.

10. The system of claim 9, wherein said testing system comprises an oil meter, a gas meter and a water meter.

11. The system of claim 9, wherein said testing system is mounted on said skid.

12. The system of claim 9, wherein each said desander is a flooded core hydrocyclone desander.

13. The system of claim 9, wherein each said desander is a high pressure flooded core hydrocyclone desander.

14. The system of claim 13, further comprising a low pressure desander downstream of said high pressure flooded core hydrocyclone desander.

15. The system of claim 9, wherein said choke manifold is an automated choke manifold.

16. The system of claim 9, wherein the one or more properties of said cleaned fluid include a percentage of oil, gas and water.

* * * * *